F. G. KEYES.
WIRE DRAWING MACHINERY.
APPLICATION FILED MAR. 22, 1918.
1,341,986. Patented June 1, 1920.
2 SHEETS—SHEET 1.
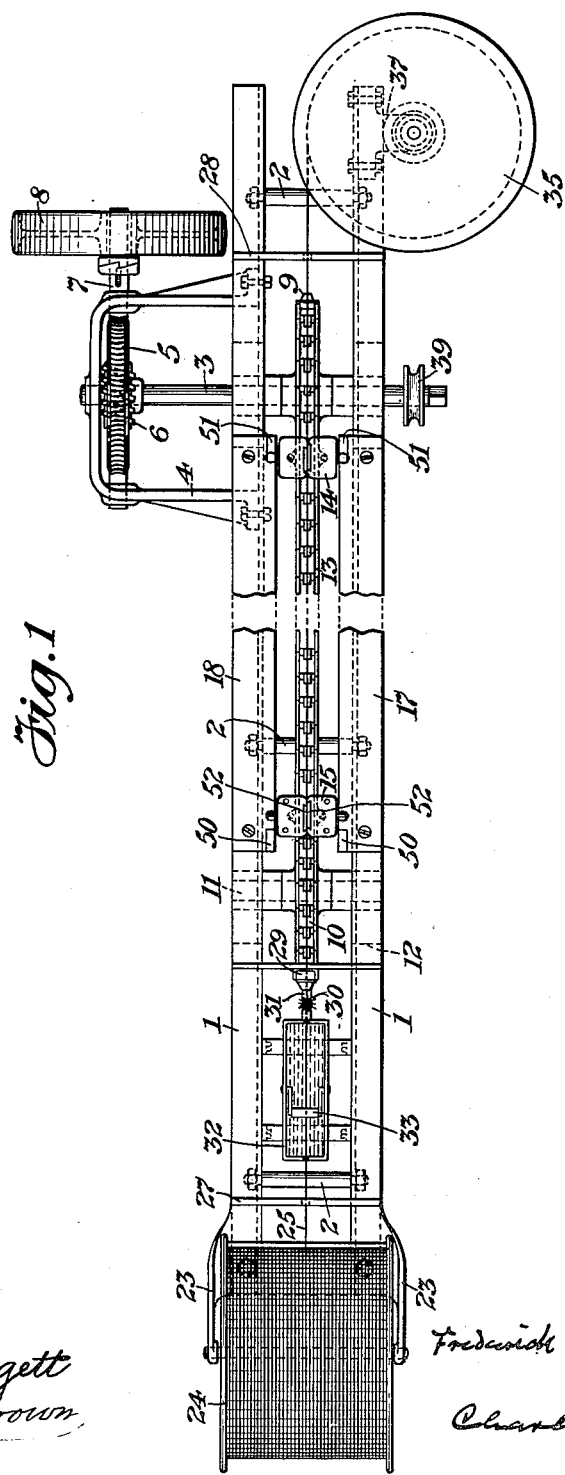

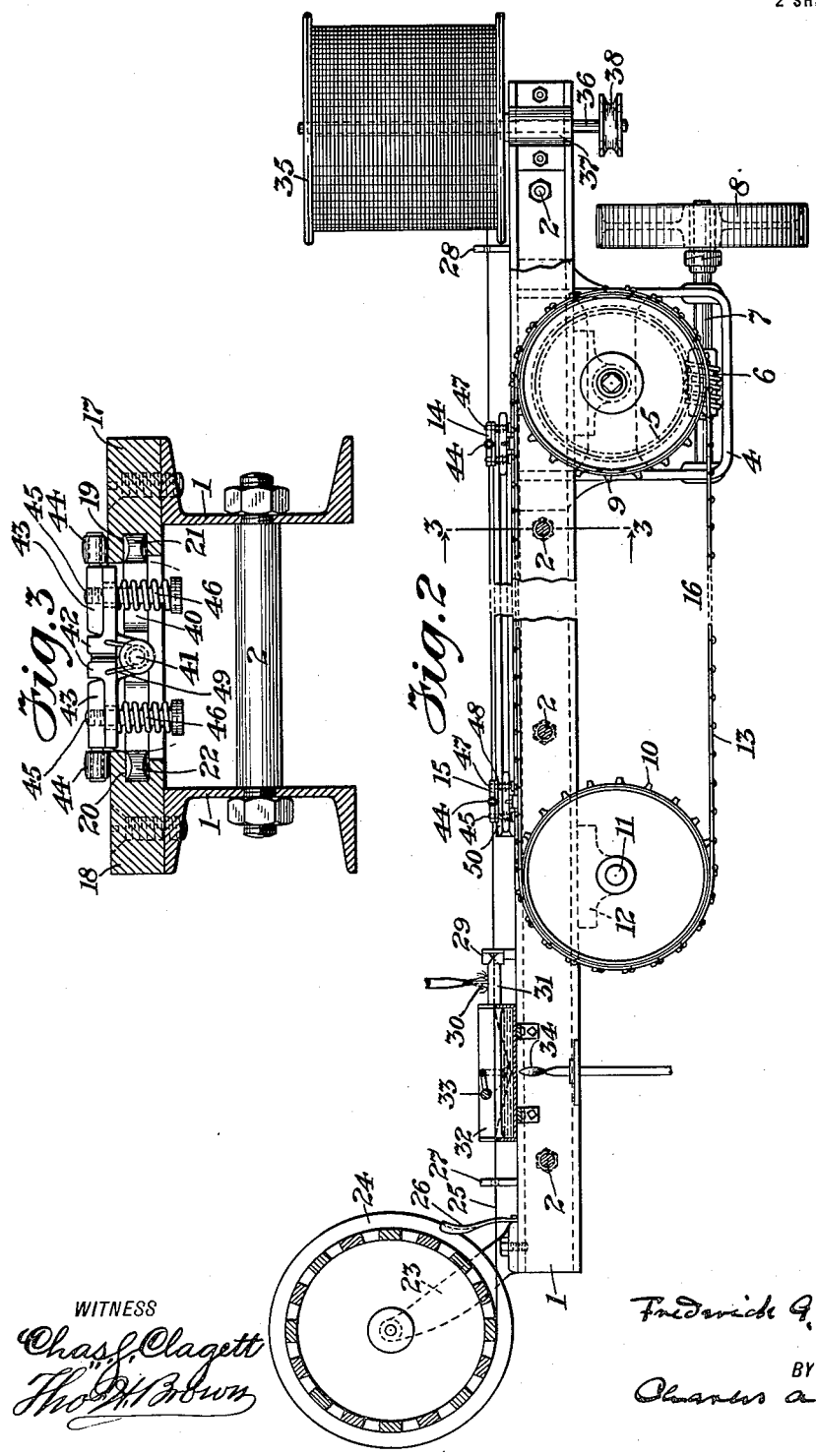

UNITED STATES PATENT OFFICE.

FREDERICK G. KEYES, OF HOBOKEN, NEW JERSEY, ASSIGNOR TO COOPER HEWITT ELECTRIC COMPANY, OF HOBOKEN, NEW JERSEY, A CORPORATION OF NEW JERSEY.

WIRE-DRAWING MACHINERY.

1,341,986.          Specification of Letters Patent.          Patented June 1, 1920.

Application filed March 22, 1918. Serial No. 223,895.

*To all whom it may concern:*

Be it known that I, FREDERICK G. KEYES, a citizen of the United States, and resident of Hoboken, county of Hudson, State of New Jersey, have invented certain new and useful Improvements in Wire-Drawing Machinery, of which the following is a specification.

My invention relates to wire drawing machines wherein gripping devices mounted on a continuously moving endless chain operate in conjunction with a die through which the wire to be reduced in size is drawn; and the objects of my invention are, first, to provide devices for insuring the engagement of the gripping devices with the wire at one end of the machine and the disengagement of each of said grips and the wire at the opposite end of the machine and after another gripping device has taken hold of the wire at the first mentioned end, whereby a steady pull on the wire is exerted and breaks due to uneven pulling are avoided; second, affording facilities for heating the die and for heating the wire prior to its passage through the die; and for coiling the drawn wire on a suitable drum.

I have illustrated my invention in the accompanying drawings in which Figure 1 is a plan view of my new machine; Fig. 2 is a side elevation thereof, partly sectional, and Fig. 3 is a sectional view at the line 3, 3, in Fig. 2.

In the drawings a table or bench made up of two parallel T, I or L beams, 1, 1, held in place by means of bolts 2, 2, 2, is supported on suitable standards (not shown). Below the bench 1, and to one side thereof, there is mounted the driving mechanism of the machine, the shaft, 3, being journaled in a hanger, 4, and being provided with a driving gear, 5, driven by a worm gear, 6, mounted on a shaft, 7, which, in turn, is actuated by a pulley, 8, connected with any suitable sources of power. On the driven shaft, 3, and in the open space between the sides of the bench there is mounted a sprocket wheel, 9, which coöperates with a sprocket, 10, loosely mounted on a suitably supported shaft, 11, journaled in a bracket, 12, by means of a sprocket chain, 13, trained over the sprocket wheels 9 and 10. At suitable intervals along the length of the sprocket chain there are mounted wire-gripping devices, 14, 15 and 16. On either side of the table I have mounted guide plates 17 and 18 which are channeled as shown at 19 and 20 (Fig. 2) to receive the lugs, 21 and 22 on the base plates of the wire grips 14, 15 and 16.

At one end of the table there is mounted in suitable brackets, 23, 23, a drum, 24, about which is coiled the wire, 25, to be drawn. A spring brake, 26, mounted on one side of the table presses against the drum 23 to regulate the speed thereof. Suitable guides, 27 and 28, for holding the wire in a straight line during its progress through the machine are provided, one at each end.

A suitable die, 29, through which the wire is to be drawn, is provided at the feeding end of the machine. When desired, the die, 29, is heated, as by a flame, 30, playing on a sleeve, 31, through which the wire passes, the sleeve being attached to the die 29. In the event that a preheating of the wire itself is desired, this can be accomplished by passing the wire through a lead bath, 32, the wire passing under a roller, 33, submerged in said bath. The bath itself is maintained at a suitable temperature by a source of heat, such as a flame, 34.

A drum, 35, mounted on a shaft, 36, is journaled in a bracket, 37, mounted on one side of the bench to receive the wire after it has been passed through the die. The receiving drum 35 is rotated by the pulley, 38, on the end of the shaft, 36, which is connected by a belt (not shown) with a pulley, 39, on the main driving shaft 3.

The gripping devices 14, 15 and 16 are shown in detail in Fig. 3. Here the base plate of the gripping device is shown at 40, the sides or lugs, 21 and 22, of which engage with the grooves 19 and 20. Through the center of this base plate a bolt, 41, extends on both sides thereof and acts as a bearing on both sides of said base plate for the pivoted jaws 42, 42. Above the jaws 42, 42 and coöperating therewith are plates, 43, 43, each provided at one side and at the center thereof with a roller bearing, 44, 44, engaging with the top sides of the plates 17 and 18. The members 43 and 42 are yieldably joined together by means of bolts 45, 45 screwed in the plates 43, and springs, 46, 46, one end of each spring abutting against the bottom of the jaw plates 42, 42 and the other end of each spring abutting against the heads of the bolts 45, 45. The arrangement of bolts 45 and springs 46 is duplicated on the other end of the gripping device as indicated at 47, and 48. A spring, 49, is provided for insuring that the jaws 42, 42, will separate from the wire at the end of the runway. When a wire is gripped by the jaws, the jaw plates 42, 42 are moved from the level position shown in Fig. 3 a distance determined by the width of the wire and will rest on the contiguous edge of the plates 43, as a bearing, and be held there by the compressing action of the springs 46, 48, which aid the jaws in holding the wire.

It is desirable sometimes to face the inside of the grip jaws in contact with the wire with a small section of jewelers file. This is illustrated in Fig. 1, at 52, 52. It is, however, in many cases only necessary to use the smooth faces of the jaws for many of the softer metals. The rougher jaws are more suitable for tungsten, molybdenum, or platinum-iridium.

After a portion of the wire to be drawn has been passed through the die and attached and placed in the jaws of the wire grip 15, and the machine started into operation, the grip will pull the wire along with it until it reaches the position at the extreme right of the machine whereupon the grip 16 will come into place at the left hand end of the runway, the rollers 44, 44, will move up the tapered portions 50, 50, of the plates 17 and 18, closing the jaws on the wire and travel a short distance before the rollers 44, 44, run down the tapered portions 51, 51, causing the grip 15 to let go of the wire. The grip 16, then, in its turn, will pull the wire along until it reaches a point near the right hand end of the trackway when the grip 14 will enter the track at the other end and grip the wire before the grip 16 has released it. It is important to so space these grips on the endless chain 13 that one shall have taken hold before the other has let go as in this way a steady pull is exerted on the wire being drawn through the die 29 and breaks in the wire due to the strains of uneven pulling are avoided. The drawn wire is coiled on the receiving drum 35 and may be redrawn by interchanging the drums 35 and 24 and substituting a new die at 29 and the process repeated as described herein. The length of the strip 17, 18 can evidently be made of a length sufficient to carry out this process of successive and simultaneous gripping of the wire when the three grips are evenly spaced on the endless chain. The speed of drawing wire of a given material depends considerably upon the properties of the material. For example, a hard material, such as tungsten or even nickel-chromium wire, requires a slower drawing than does a wire of comparatively soft material, such as copper or silver. By means of a series of gears (not shown in the drawings) it is possible to vary the rate at which the wire is drawn through the dies, the smaller sizes of wire requiring a much slower rate of passage through the wire than do the coarser sizes.

The annealing of the wire is of considerable importance and in some cases it is even necessary to draw the wire at an elevated temperature.

While I have shown only three gripping devices, it is to be understood that the number of said grips can be increased to meet the varying condition of service to which a machine operating on the principle described herein may be subjected.

I claim as my invention:

1. An apparatus for drawing a wire consisting of a revolving drum for holding and releasing the wire, a die for reducing the diameter thereof, gripping devices mounted on an endless chain for pulling the wire, said gripping devices comprising a base plate, a pair of jaws pivoted on said base plate and a pair of plates yieldingly mounted on said base plate and functioning as bearings for the jaws, and a receiving drum around which the drawn wire is wound.

2. An apparatus for drawing a wire consisting of a drum for holding the wire, a die for reducing the diameter thereof, gripping devices for pulling the wire through the die, said gripping devices comprising a base plate, a pair of jaws pivoted on said base plate and a pair of plates yieldingly mounted on said base plate and functioning as bearings for the jaws, and a receiving drum around which the drawn wire is wound.

3. An apparatus for drawing a wire consisting of a drum for holding the wire, a die for reducing the diameter thereof, means for pulling the wire through the die, said means including a gripping device comprising a base plate, a pair of jaws pivoted on said base plate and a pair of plates yieldingly mounted on said base plate and functioning as bearings for the jaws, and means for coiling the drawn wire.

4. In a wire drawing machine, the combination with a support, of a drum suitably mounted thereon for holding the wire to be drawn, a die, gripping devices mounted on an endless chain for engaging and releasing the wire, said gripping devices comprising a base plate, a pair of jaws pivoted on said base plate and a pair of plates yieldingly mounted on said base plate and functioning as bearings for the jaws, and a receiving drum suitably mounted on said support around which the drawn wire is wound.

5. In a wire drawing machine, the combination with a support, of a drum for holding the wire, a die, gripping devices mounted on an endless chain and coöperating sprocket wheels for conveying said chain, said gripping devices comprising a base plate, a pair of jaws pivoted on said base plate and a pair of plates yieldingly mounted thereon and functioning as bearings for the jaws.

6. In a wire drawing machine, the combination with a die, of a support therefor, and means for pulling the wire through the die, said means including gripping devices comprising a base plate, a pair of jaws pivoted on said base plate and a pair of plates yieldingly mounted on said base plate and functioning as bearings for the jaws.

7. In a wire drawing machine, the combination with a die, of a support therefor, and means for pulling the wire through the die, said means including a gripping device comprising a base plate, a pair of jaws pivoted on said base plate and a pair of plates yieldingly mounted on said base plate and functioning as bearings for the jaws.

8. In a wire drawing machine, the combination with a die, of a support therefor, means for pulling the wire through the die, said means including gripping devices comprising a base plate, a pair of jaws pivoted on said base plate and a pair of plates yieldingly mounted on said base plate and functioning as bearings for the jaws, and means for insuring a constant pull on said wire.

9. In a wire drawing machine, the combination with a die, of means for continuously pulling the wire through the die, said means including gripping devices comprising a base plate, a pair of jaws pivoted on said base plate and a pair of plates yieldingly mounted on said base plate and functioning as bearings for the jaws.

Signed at New York, in the county of New York and State of New York this 14th day of March, A. D. 1918.

FREDERICK G. KEYES.